United States Patent
Dubourg et al.

(10) Patent No.: US 10,686,652 B2
(45) Date of Patent: Jun. 16, 2020

(54) METHOD FOR CONTROLLING THE LOAD OF A DATA CONCENTRATION GATEWAY FOR A WIRELESS COMMUNICATION NETWORK

(71) Applicant: KERLINK, Thorigné-Fouillard (FR)

(72) Inventors: Ronan Dubourg, Noyal-sur-Vilaine (FR); Yannick Delibie, Thorigné-Fouillard (FR)

(73) Assignee: KERLINK, Thorigné-Fouillard (FR)

( * ) Notice: Subject to any disclaimer, the term of this patent is extended or adjusted under 35 U.S.C. 154(b) by 0 days.

(21) Appl. No.: 16/329,692

(22) PCT Filed: Aug. 24, 2017

(86) PCT No.: PCT/FR2017/052275
§ 371 (c)(1),
(2) Date: Feb. 28, 2019

(87) PCT Pub. No.: WO2018/042110
PCT Pub. Date: Mar. 8, 2018

(65) Prior Publication Data
US 2019/0199581 A1 Jun. 27, 2019

(30) Foreign Application Priority Data
Aug. 29, 2016 (FR) ..................... 16 58015

(51) Int. Cl.
*H04L 12/24* (2006.01)
*H04W 88/16* (2009.01)
(Continued)

(52) U.S. Cl.
CPC .......... *H04L 41/0681* (2013.01); *H04L 43/16* (2013.01); *H04L 47/28* (2013.01);
(Continued)

(58) Field of Classification Search
CPC ......... H04L 47/10; H04L 47/11; H04L 47/12; H04L 2012/5631; H04L 47/15;
(Continued)

(56) References Cited

U.S. PATENT DOCUMENTS

| 6,067,287 A | * | 5/2000 | Chung-Ju | .......... H04Q 11/0478 370/232 |
| 6,553,235 B2 | * | 4/2003 | Bark | .................... H04W 52/343 455/453 |

(Continued)

FOREIGN PATENT DOCUMENTS

FR          3032849 A1     8/2016

OTHER PUBLICATIONS

International Search Report dated Nov. 16, 2017 from corresponding International Application No. PCT/FR2017/052275 filed Aug. 24, 2017.
(Continued)

*Primary Examiner* — Brenda H Pham
(74) *Attorney, Agent, or Firm* — Berenato & White, LLC

(57) ABSTRACT

The invention relates to a method for controlling the load of a data concentration gateway for a wireless communication network, the method comprising: —receiving a plurality of data signals from a plurality of remote client devices, —providing the communication start date of each data signal received, —selecting a received data signal, —determining a communication end date of each data signal received, —determining a number of data signals received by the gateway that are different from the selected data signal, which have a communication end date that is between the communication start date of the selected data signal and the communication end date of the selected data signal, —comparing the number of data signals to a threshold number, and —emitting an alarm signal in response to
(Continued)

the detection that the number of data signals is greater than the threshold number.

11 Claims, 3 Drawing Sheets

(51) Int. Cl.
  *H04L 12/26* (2006.01)
  *H04L 12/841* (2013.01)
  *H04W 28/02* (2009.01)
  *H04W 4/70* (2018.01)
  *H04W 24/04* (2009.01)

(52) U.S. Cl.
  CPC ....... *H04W 28/0215* (2013.01); *H04W 88/16* (2013.01); *H04W 4/70* (2018.02); *H04W 24/04* (2013.01)

(58) Field of Classification Search
  CPC ..... H04L 47/70; H04L 47/22; H04L 47/2441; H04L 12/5602; H04L 2012/568; H04L 47/50; H04L 2012/5608; H04L 84/12; H04L 88/08; H04L 47/27; H04L 2012/5635; H04L 2012/5636; H04L 2012/5632; H04L 2012/2636; H04L 47/35; H04L 47/30; H04L 47/32; H04L 47/215; H04L 47/20; H04L 47/21
  USPC .... 370/229, 230, 232, 233, 234, 235, 235.1, 370/401, 402
  See application file for complete search history.

(56) References Cited

U.S. PATENT DOCUMENTS 8,295,838 B2 * 10/2012 Abdel-Kader ........ H04W 24/08
  455/436
2015/0327152 A1 * 11/2015 Tsutsui ............. H04W 28/0289
  455/404.1

OTHER PUBLICATIONS

Lora Alliance et al, "A technical overview of LoRa What is it?", (May 31, 2016), URL: http://www.semtech.com/wireless-rf/iot/LoRaWAN101_final.pdf, (Dec. 6, 2016), XP055326494 [A] 1-11 * p. 3-p. 4 * * p. 8-p. 9 *.
So Jaeyoung et al, "LoRaCloud: LoRa platform on OpenStack", 2016 IEEE Netsoft Conference and Workshops (Netsoft), IEEE, (Jun. 6, 2016), doi:10.1109/Netsoft.2016.7502471, pp. 431-434, XP032917859 [A] 1-11 * paragraph I ** paragraph II.A * * figure 1 * DOI: http://dx.doi.org/10.1109/Netsoft.2016.7502471.

* cited by examiner

METHOD FOR CONTROLLING THE LOAD OF A DATA CONCENTRATION GATEWAY FOR A WIRELESS COMMUNICATION NETWORK

CROSS-REFERENCE TO RELATED APPLICATIONS AND CLAIM TO PRIORITY

This application is a national stage application of International Application No. PCT/FR2017/052275 filed Aug. 24, 2017, which claims priority to French Patent Application No. 1658015 filed Aug. 29, 2016, the disclosures of which are incorporated herein by reference and to which priority is claimed.

FIELD OF THE INVENTION

The invention relates to the field of methods and devices for radio data communication, notably in the field of the internet of things. More particularly, the invention relates to the field of data concentration gateways for a wireless communication network and the control of these gateways.

BACKGROUND OF THE INVENTION

The internet of things consists in enabling everyday objects to communicate data automatically using a wireless network. For example, a water meter equipped with a communication module can automatically communicate a water reading to the business in charge of billing for water consumption.

Gateways, also called base stations, have the purpose of allowing the wireless reception and transmission of data from and to communication modules present in their coverage area, and relaying these data to devices responsible for processing them, for example servers that can be accessed on a network based on the IP protocol ("internet protocol").

A number of radio access technologies are available for the implementation of network communication modules. The LoRa™, Sigfox™ or WM-Bus (from the English "Wireless Meter Bus") technologies, which are based, notably, on different types of modulation, can be mentioned here purely by way of illustration and without limiting intent.

These technologies have the common feature of providing long distance (called "long range" in English) communications, making it possible to reduce the number of gateways while increasing their coverage.

However, the communication between the communication modules and the gateway on the one hand, and between the gateway and the remote devices responsible for processing the data passing through the gateway on the other hand, are based on different communication protocols. The gateway must therefore demodulate the signals that it receives from the different communication modules present in its coverage radius before transmitting the corresponding information to the different remote devices involved. For this purpose, these signals are processed by different demodulators incorporated in the gateway. However, the number of signals that can be processed simultaneously by a gateway under good conditions is limited by the number of demodulators that it contains. Moreover, the number of signals to be processed simultaneously by the gateway can vary over time. A method is therefore required for controlling the load on a gateway.

SUMMARY OF THE INVENTION

The present invention enables this requirement to be met. For this purpose, the invention provides a method for controlling the load on a data concentration gateway for a wireless communication network, the method comprising:
  receiving a plurality of data signals from a plurality of remote client devices,
  providing a communication start date for each data signal received,
  selecting a received data signal,
  determining a communication end date for each data signal received,
  determining a number of data signals received by the gateway that have a communication end date that is between the communication start date of the selected data signal and the communication end date of the selected data signal,
  comparing the number of data signals with a threshold number, and
  transmitting an alarm signal in response to the detection that the number of data signals is greater than the threshold number.

As a result of these characteristics, an alarm is transmitted as soon as the load on the gateway exceeds a threshold number of simultaneously processed signals. These characteristics therefore make it possible to check that the load on the gateway does not exceed a predetermined threshold.

According to other advantageous embodiments, such a method for controlling the load on a data concentration gateway can have one or more of the following characteristics:

According to one embodiment, the gateway comprises a plurality of demodulators, each demodulator of the gateway being configured to demodulate data signals received by the gateway, the method further comprising a step of demodulating the plurality of data signals by the demodulators.

According to one embodiment, the threshold number corresponds to the number of demodulators in the gateway. Therefore, the control method makes it possible to check that the number of signals processed simultaneously by the gateway does not exceed the number of demodulators that can process the data signals.

According to one embodiment, the gateway comprises a radio communication interface configured to receive a plurality of wireless data signals, the radio communication interface being connected to the demodulators, the method comprising a step of transmitting each of the data signals received by the communication interface to a respective demodulator.

According to one embodiment, the gateway further comprises an antenna for receiving the signals.

According to one embodiment, the receiving antenna is configured to receive data signals at a frequency selected from the frequency group of 433 MHz, 868 MHz and 915 MHz.

According to one embodiment, each data signal is a frame of a communication protocol selected from LoRa technology, Sigfox technology and WM-BUS technology.

According to one embodiment, determining the communication end date of each received data signal comprises, for each received data signal:
  determining a length of the frame corresponding to the received data signal, and
  calculating the communication end date of the frame corresponding to the received data signal as a function of the frame length and of a data rate of a radio channel by which the data signal has been received.

According to one embodiment, the gateway comprises an internal clock capable of providing a time stamp data element corresponding to the communication start date of each data signal received.

According to one embodiment, the control method further comprises storing the communication end date of each data signal of the plurality of data signals in a memory of the gateway.

According to one embodiment, the gateway control method further comprises:
receiving synchronization data from a remote device connected to the gateway,
synchronizing the internal clock of the gateway on the basis of the synchronization data.

According to one embodiment, the invention also provides a data concentration gateway for a wireless communication network comprising a set of remote client devices transmitting data signals, the concentration gateway comprising:
a radio communication interface configured to receive radio data signals from the set of client devices,
a plurality of demodulators configured to demodulate the data signals received by the communication interface,
a control unit configured to execute the above control method.

According to one embodiment, the concentration gateway further comprises a network interface connected to a remote network and configured to transmit the demodulated data signals.

According to one embodiment, the concentration gateway further comprises an alarm configured to send an alarm data signal to a gateway management device connected to the gateway. Such a gateway management device is, for example, connected to the gateway by means of the remote network. Such a gateway management device can be connected to a plurality of gateways.

Some aspects of the invention are based on the idea of providing a method for controlling the load on a gateway. Some aspects of the invention are based on the idea of transmitting an alarm if a gateway overload is detected. Some aspects of the invention are based on the idea of determining the number of data signals processed simultaneously by the gateway. Some aspects of the invention are based on the idea of checking that the number of data signals received and processed simultaneously by the gateway does not exceed the number of demodulators in the gateway. Some aspects are based on the idea of monitoring the gateway load for each data signal received by the gateway.

BRIEF DESCRIPTION OF THE DRAWINGS

The invention will be better understood and other objects, details, characteristics and advantages thereof will be more readily apparent from the following description of some specific embodiments of the invention, provided solely for illustrative purposes and in a non-limiting way, with reference to the attached drawings.

DETAILED DESCRIPTION OF THE PREFERRED EMBODIMENT(S)

Figure 1:
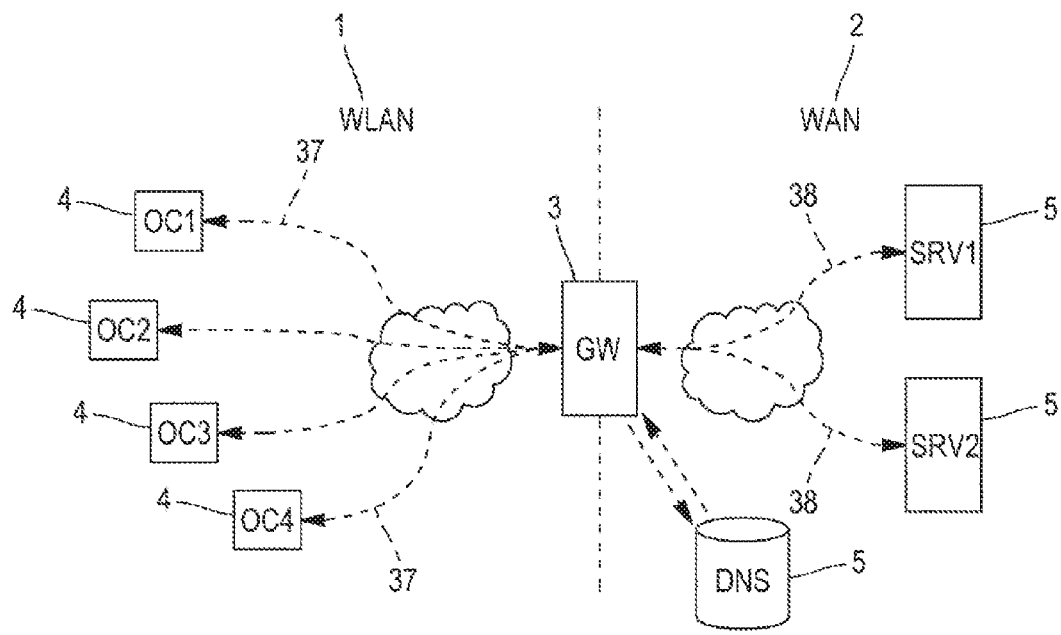
FIG. 1 is a schematic representation of an interconnection between a wireless local area network and a wide area network by means of a concentration gateway.

In FIG. 1, a first wireless local area communication network (WLAN, for "Wireless Local Area Network") 1, referred to hereafter as the wireless local area network 1, is interconnected with a wide area communication network 2 (WAN, for "Wide Area Network"), for example the internet, by means of a gateway 3. The gateway 3 comprises network interfaces enabling it to belong to both the wireless local area network 1 and the wide area network 2.

In addition to the gateway 3, the wireless local area network 1 comprises a set of communicating objects 4, wherein four are illustrated by way of example in FIG. 1. These communicating objects 4 can be, for example, wireless sensors such as water meters, gas meters, or other meters. These communicating sensors, equipped with wireless communication modules, can communicate, according to their characteristics, measured data, such as a water, gas or other meter reading, to the concentration gateway 3. These communicating objects 4 have the distinctive characteristic of consuming very little energy, being commonly called "low consumption" objects, and of using communication means with a very low data rate, of less than 2 Kbps for example.

The communicating objects 4 mostly run on rechargeable batteries or disposable batteries. To optimize their power consumption, the time periods during which the communicating objects 4 can transmit or receive data are limited. Outside these transmission and/or reception periods, the communicating objects 4 are, for example, on standby, thereby reducing their electricity consumption. In the context of FIG. 1, the wireless local area network 1 is, for example, a Zigbee network, a LoRa network, a Bluetooth network of the conventional or low energy (Bluetooth Smart) type, or any other network not based on the IP communication protocol. However, this wireless local area network 1 is an addressed network, that is, each communicating object 4 can be identified uniquely in this wireless local area network 1 by means of its own identifier, for example a MAC (from the English "Media Access Control") address.

For its part, the wide area network 2 is based on the IP communication protocol such as the internet or a 3G/4G or other communication network. This wide area network 2 comprises, in addition to the gateway 3, remote devices 5 such as servers, DNS ("Domain Name System") servers, database storage devices, or others. Each remote device 5 connected to this wide area network 2 is identified by an IP address. The remote devices 5 are configured for collecting and processing information from some or all of the various communicating objects 4 present on the wireless local area network 1.

Since the wireless local area network 1 and the wide area network 2 use different communication protocols, the gateway 3 acts as an interface between the communicating objects 4 and the remote devices 5. Typically, the gateway 3 acts as a switching platform for carrying data from the communicating objects 4 to the remote devices 5, and vice versa. The gateway 3 must therefore have a mechanism for establishing bi-directional communication sessions with, on the one hand, each communicating object 4, as indicated by the arrows 37, and, on the other hand, the remote devices 5, as indicated by the arrows 38. An example of a gateway 3 for establishing these bi-directional communications with the communicating objects 4 and the remote devices 5 is shown in FIG. 2.

Figure 2:
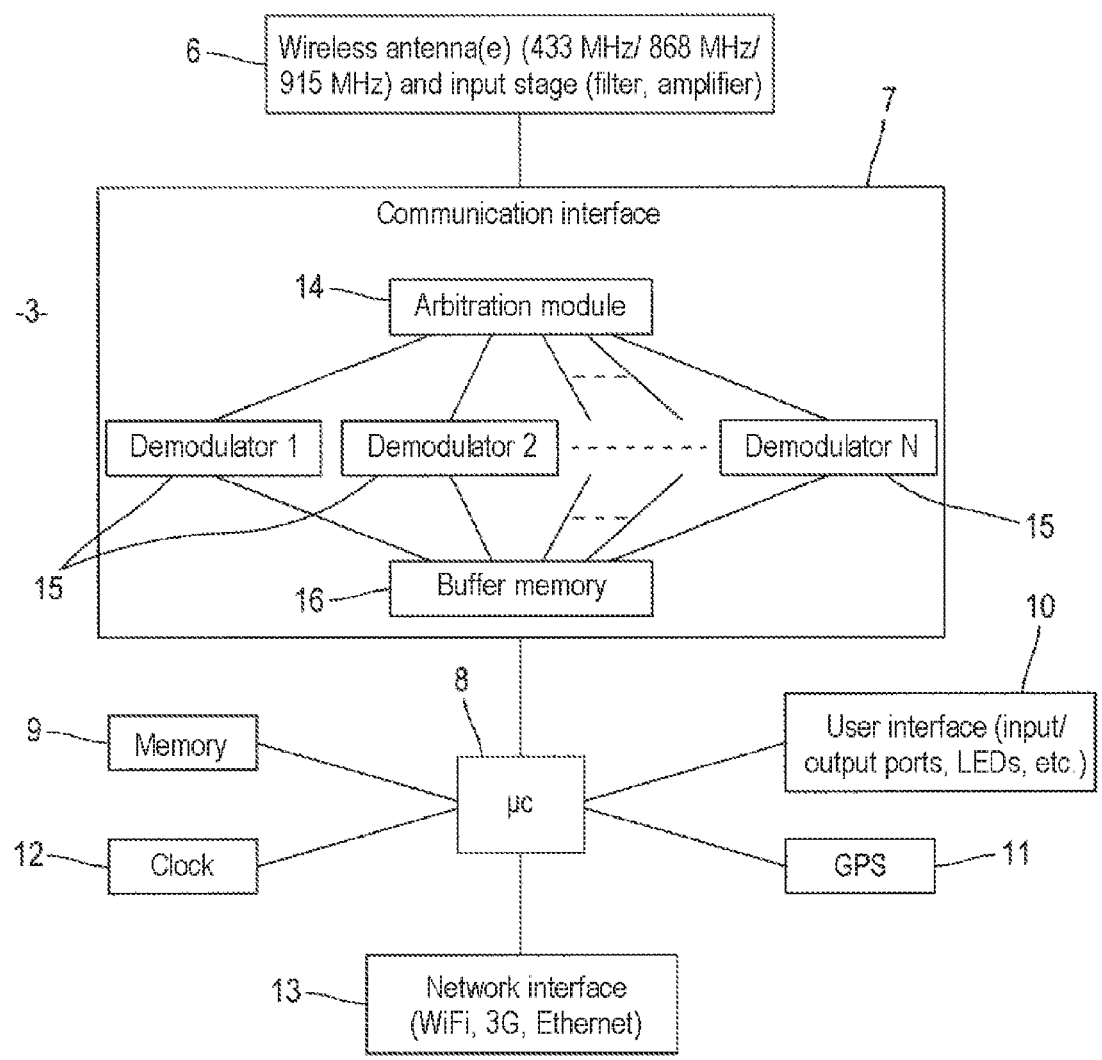
FIG. 2 is a schematic functional representation of the concentration gateway of FIG. 1.

The gateway 3 as shown in FIG. 2 comprises a plurality of components. In particular, the gateway 3 comprises a radio front-end module 6, a baseband processing module 7, a microcontroller 8, an internal memory 9, a user interface 10, a GPS 11, a clock 12 and a network interface 13.

The radio front-end module 6 has the function of transmitting and receiving radio waves to and from communicating objects 4. For this purpose, the radio front-end module 6 comprises at least one radio antenna (not shown). This radio antenna is intended to radiate or capture radio waves carrying the data to be exchanged with the communicating objects 4 by means of a radio transmission channel. The radio front-end module 6 can, for example, communicate with the communicating objects 4 on a radio channel having a frequency of 433 MHz, 868 MHz, or alternatively 915 MHz or another frequency, according to the current regulations. The radio front-end module 6 is connected to the baseband processing module 7 of the gateway 3 in order to be able to transmit to it the radio signals received by the gateway 3 and receive the data signals to be transmitted by the gateway 3.

The baseband processing module 7 of the gateway 3 has the function of preparing the data signals received by the gateway 3 for processing by the microcontroller 8. For this purpose, the baseband processing module 7 comprises an arbitration module 14, a plurality of demodulators 15 and a buffer memory 16.

The arbitration module 14 receives all the data signals from the radio front-end module 6. The arbitration module 14 is connected to all the demodulators 15. The arbitration module 14 distributes the data signals received by the gateway 3 to the demodulators 15. This distribution of the data signals received by the gateway can be carried out according to numerous distribution criteria. This distribution can, for example, be carried out on the basis of the availability of the demodulators 15, the data rate of the data signals, the radio communication channels, the strength of the data signals, or other factors.

The arbitration module 14 is capable of simultaneously detecting a plurality of headers of the packets to be demodulated, including in the context of data signals received at different data rates. However, each demodulator can only demodulate one packet at a time. Therefore, the number of packets that can be demodulated simultaneously by the gateway 3 is limited by the number of demodulators 15 incorporated in the gateway 3.

The demodulators 15 incorporated in the baseband processing module 7 can have different characteristics, particularly different programming characteristics based on need.

Thus, in a first alternative, a demodulator 15 can be configured to use a given frequency from among a plurality of permitted frequencies. The demodulation bandwidth of the demodulator 15 can, for example, be configured at 125, 250 or 500 kHz. The data rate permitted by the demodulator 15 can also be configured at any data rate from among a plurality of available data rates. However, only one data signal having the data rate to which the demodulator 15 is actually configured will be demodulated. Such a configurable demodulator 15 is preferably intended to act as a high data rate link to other gateways or remote devices 5.

In a second alternative, the demodulator 15 can be designed to operate with a bandwidth that cannot be modified or configured, for example a predefined bandwidth of 125 kHz. However, the data rate of a demodulator 15 according to this second alternative remains adaptable, so that the demodulators 15 according to this second alternative can receive signals at different data rates without prior configuration. The demodulators 15 according to this second alternative are preferably dedicated for use in a star network comprising a large number of communicating objects 4. Preferably, the communicating objects 4 located near the gateway 3 will use a maximum possible data rate at a fixed bandwidth of 125 kHz (about 6 kbit/s, for example), whereas the communicating objects 4 that are distant from the gateway 3 will use a lower data rate (down to 300 bit/s, corresponding to the minimum LoRa data rate for a channel at 125 kHz).

Preferably, the communicating objects 4 can change their transmission frequency for each transmission, thus allowing an adaptation of the dynamic data rate according to the configuration of their link without adding complexity. Furthermore, there is no need to update a table of the data rates used by the different communicating objects 4, because all the data rates are demodulated in parallel by the baseband processing module 7.

Each packet demodulated by a demodulator 15 is associated with metadata. These metadata are detected by the baseband processing module 7. These metadata comprise the start date of the packet transmission, the packet length, and the data rate of the packet transmission. The demodulated packet and the associated metadata are stored in the buffer memory 16 of the baseband processing module 7. The baseband processing module 7 is connected to the microcontroller 8 of the gateway 3 such that the microcontroller 8 of the gateway 3 has access to the buffer memory 16 of the baseband processing module 7.

In the baseband processing module 7, when any of the demodulators 15 demodulates a packet, this packet is stored with additional information, called metadata, in the buffer memory 16. The metadata comprise, for example:
  a radio channel identifier,
  the average signal to noise ratio over the length of the packet (in dB),
  the minimum signal to noise ratio over the length of the packet (in dB),
  the maximum signal to noise ratio over the length of the packet (in dB),
  the average signal strength over the duration of the packet (in dB),
  time stamp data for the start of the packet,
  error correction code values,
  an identifier of the demodulator,
  a peak correlation position,
  the signal to noise ratio of the detection correlation.

Similarly, the baseband processing module 7 can be used to transmit to the radio front-end module 6 the data from the remote devices 5 to be transmitted by the radio front-end module 6. An example of a baseband processing module 7 that can be incorporated into the gateway 3 is the SX1301 processor produced by Semtech®, a US company.

The microcontroller 8 is connected to all the elements of the gateway 3 in such a way as to manage the gateway 3 and allow the data transfer between the wireless local area network 1 and the wide area network 2. In particular, the microcontroller 8 can be used to implement the various operating processes of the gateway 3. The programs defining the various operating processes of the gateway 3 are, for example, stored in the internal memory 9 of the gateway. These operating processes can be of any type capable of managing the gateway 3, for example a process of processing data signals received by the gateway in order to transmit them to their recipients, a process of synchronizing the gateway 3 using GPS 11 to provide reference data, or a process of synchronizing different communicating objects 4 using the clock 12.

The user interface 10 comprises a plurality of input/output means for configuring the gateway 3. These input/output means are, for example, connectors such as input or output ports providing access to the internal memory 9, USB connection devices, or other means. The user interface can also comprise human-machine interface means such as a control screen, LED lamps indicating the operating state of the gateway, or other means.

The network interface 13 of the gateway 3 can be used to connect the gateway 3 to the remote devices 5 by means of the wide area network 2.

The gateway 3 comprises, for example, a battery (not shown) for its power supply.

Figure 3:
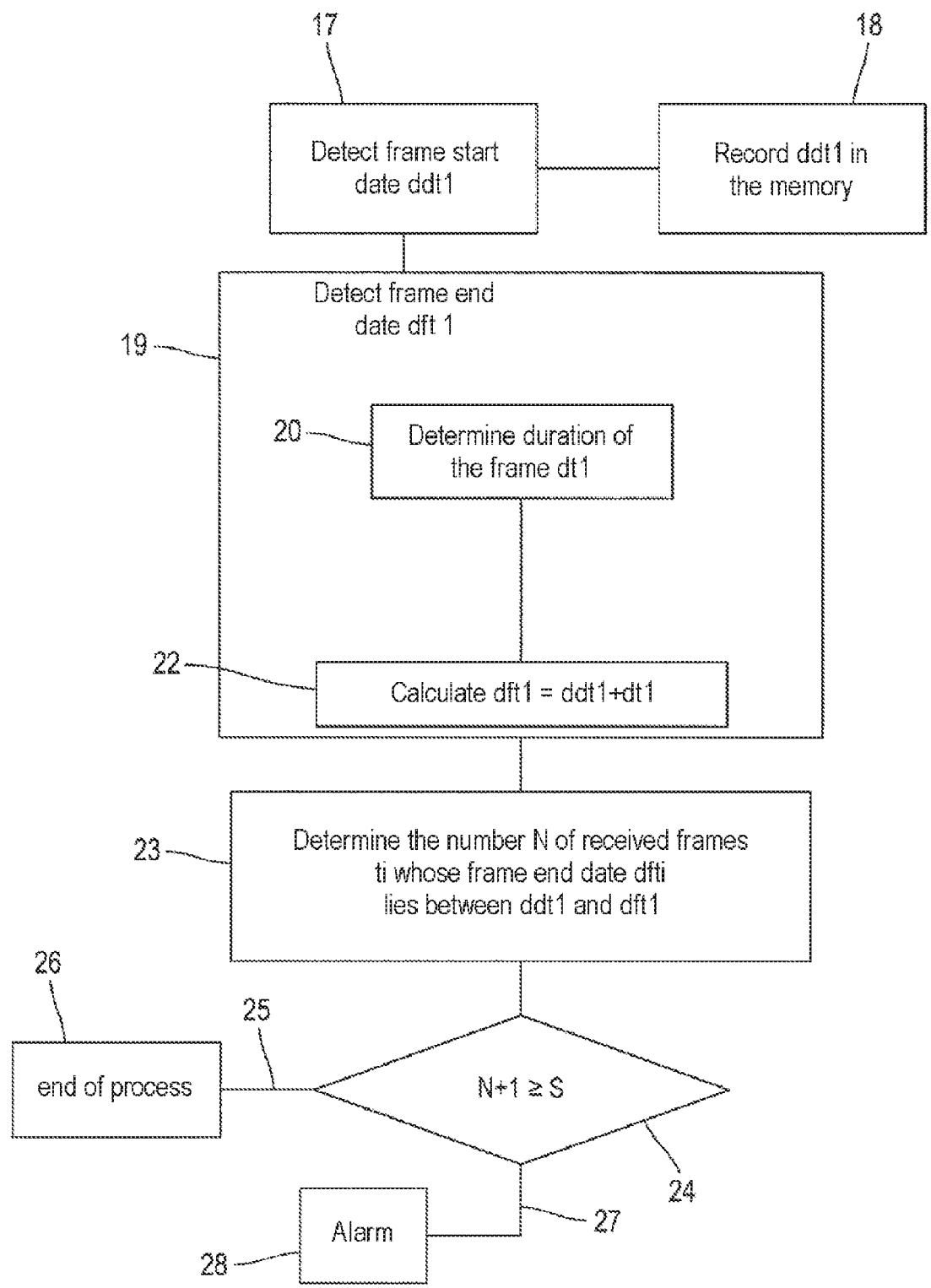
FIG. 3 is an operating diagram of a method for controlling the load on the gateway of FIG. 2.

FIG. 3 is an operating diagram of a method for controlling the load on the gateway of FIG. 2.

As explained above, when the gateway 3 receives a data signal from a communicating object 4, the corresponding packet is transmitted to one of the demodulators 15 of the baseband processing module 7 to be processed. Each demodulated packet associated with metadata and stored in the buffer memory 16 of the baseband processing module 7 generates the execution of a method of controlling the load on the gateway 3 that will now be described with reference to FIG. 3.

When the demodulator detects a frame start date ddt1 (step 17), the frame start date ddt1 is recorded as a metadata element in the buffer memory 16 (step 18). The microcontroller 8 also reads the frame start date ddt1 and determines a corresponding frame end date dft1 (step 19). For this purpose, the microcontroller 8 determines the duration of the frame dt1 (step 20) by any means possible, the frame duration dt1 being supplied, for example, by the demodulator 15, by being included in the metadata. The frame end date dft1 is calculated (step 22) on the basis of the frame duration dt1, according to the formula $$dft1 = ddt1 + dt1, \text{ where } dt1 = \frac{\ell}{ddct1}$$

where $\ell$ is the frame length in bits and ddct1 is the data rate of the channel (in bits per second)

For this purpose, the microcontroller 8 determines the frame length l (in bits) and the data rate of the channel ddct1 through which the frame has passed. This data rate of the channel ddct1 is supplied directly by the demodulator 15 according to its own parameters.

Since the frame end date dft1 has been determined (step 19), the microcontroller 8 determines the number N of frames received by the gateway 3 having a frame end date that is between the frame start date ddt1 and the frame end date dft1 (step 23). For this purpose, the microcontroller 8 can refer to the metadata stored in the buffer memory 16 of the baseband processing module 7.

The microcontroller 8 then compares the number of frames N in increments of 1 with a threshold S, that is, for example, equal to the number M of demodulators 15 present in the gateway 3 (step 24). Increasing the number N in increments of 1 makes it possible to take into account the frame for which the reception (step 17) of the frame start date ddt1 generated the execution of the process. The number of demodulators 15 present in the gateway is a known number M that is, for example, stored in the internal memory 9 of the gateway 3.

If this number N+1 is strictly less than the number M of demodulators 15 present in the gateway 3 (step 25), the method terminates without any further action by the microcontroller 8 (step 26), since the load on the gateway is considered to be non-critical.

On the other hand, if the number N+1 is greater than or equal to the number M of demodulators 15 present in the gateway 3 (step 27), the microcontroller 8 causes an alarm to be transmitted (step 28). Such an alarm can be produced in any suitable way, for example in the form of a message transmission to a remote server for managing the gateways 3, a light signal, or an audible alarm using a loudspeaker incorporated in the user interface 10 of the gateway 3, or by any other suitable means.

When an alarm is transmitted (step 28), the personnel responsible for the management and/or maintenance of the gateway 3 are informed of the overloading of the gateway 3. A number of actions can then be taken to prevent the gateway 3 from remaining overloaded. Thus, demodulators 15 can be physically added to the gateway 3 to increase its processing capacity and therefore increase the threshold number at or above which an alarm is transmitted. Another solution is to reprogram the communicating objects 4 to reduce the upload speed of the communicating objects 4 and thus spread over time the frame end dates received by some of the demodulators 15, or to shorten the packets transmitted by the communicating objects 4.

The method for controlling the load on the gateway 3 as described above is preferably executed for each new frame start date detected. Such a method for controlling the load on the gateway 3 enables the load on the gateway 3 to be estimated in a simple and economical way. This is because this method enables the load on the demodulators 15 to be determined in real time at low computing cost. This method for controlling the load on the gateway 3 can therefore be implemented in the gateway 3 without any risk of degrading its performance.

The threshold number for triggering the alarm, that is the number S to which the number N+1 is compared to in step 24, can be stored in the internal memory 9 and can represent a value other than the number of demodulators 15 present in the gateway 3. For example, this threshold number can be made to correspond to the number of demodulators less 2, thus enabling an alarm to be generated before the point where all the demodulators 15 are saturated.

Figure 4:
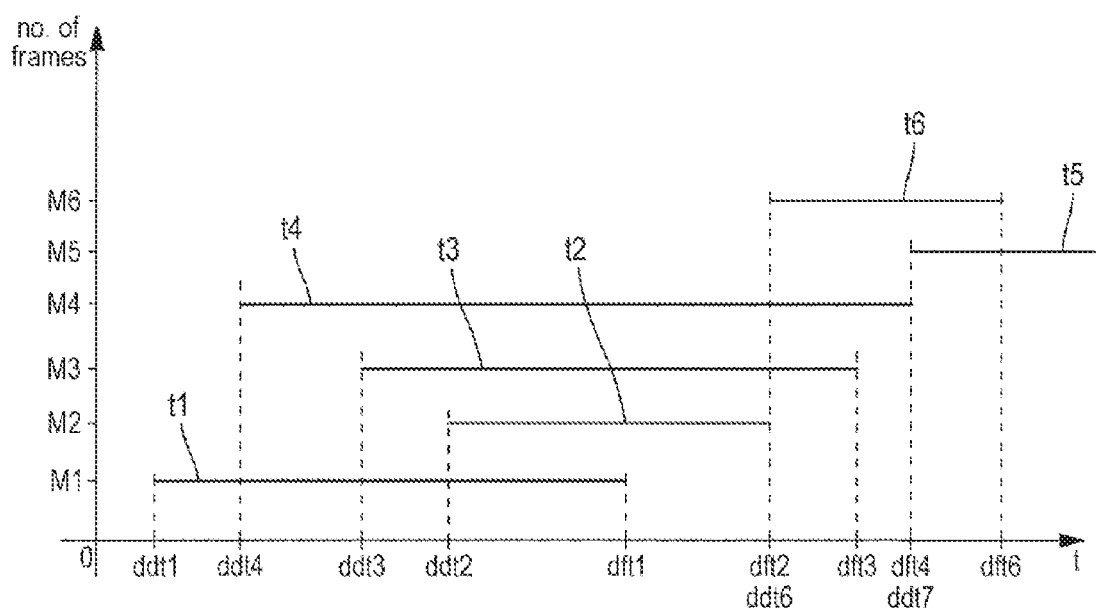
FIG. 4 is a graph showing a plurality of frames received by the gateway of FIG. 2 over a given period.

FIG. 4 is a graph showing an example of a plurality of frames received by the gateway 3 of FIG. 2 in a given period. In this diagram, the horizontal axis represents time, and the vertical axis shows different demodulators 15 processing data signals received by the gateway 3 over time.

This graph relates to the method for controlling the load on the gateway 3 executed after the processing of a frame t3 by a demodulator M3 of the gateway 3. The frame t3 has a frame start date ddt3 and a frame end date dft3, stored in the buffer memory 16 of the graphic interface 7 or determined by the microcontroller 8 using the metadata associated with the packet corresponding to the frame t3. Additionally, the execution of the process of controlling the load on the gateway described with reference to FIG. 3 comprises the step of determining the number N of frames whose frame end date is between the frame start date ddt3 and the frame end date dft3. As illustrated in FIG. 4, only the frames t1 and t2 have a frame end date, namely dft1 and dft2 respectively, which is after the frame start date ddt3 and before the frame end date dft3. The other frames have a frame end date that is after the frame end date dft3. Thus, in the present case, the method for controlling the load on the gateway executed after the processing of the frame t3 by the demodulator M3 does not generate an alarm, since the number N+1 of frames having a frame end date that is between the frame start date ddt3 and the frame end date ddf3, that is N=3, is less than the number of demodulators M, which is six in the example shown in FIG. 4.

Although the invention has been described with reference to a number of particular embodiments, it is evidently not limited in any way to these embodiments, and comprises all the technical equivalents of the means described and their combinations where these fall within the scope of the invention.

Some of the elements represented, notably the components of the gateway, can be made in different forms, in a unitary or distributed manner, using hardware and/or software components. Hardware components that can be used are ASIC specific integrated circuits, FPGA programmable logic networks, or microprocessors. Software components can be written in various programming languages, for example C, C++, Java or VHDL. This list is not exhaustive.

The use of the verb "to have", "to comprise" or "to include" and any of its conjugated forms does not exclude the presence of elements or steps other than those stated in a claim.

The invention claimed is:

1. A method for controlling the load of a data concentration gateway for a wireless communication network, the method comprising:
   receiving a plurality of data signals from a plurality of remote client devices,
   providing a communication start date for each data signal received,
   selecting a received data signal,
   determining a communication end date for each data signal received,
   determining a number of data signals received by the gateway that have a communication end date lying between a communication start date of the selected data signal and a communication end date of the selected data signal,
   comparing said number of data signals with a threshold number, and
   transmitting an alarm signal in response to the detection that said number of data signals is greater than the threshold number.

2. The control method as claimed in claim 1, wherein the gateway comprises a plurality of demodulators, each demodulator of the gateway being configured to demodulate data signals received by the gateway, the method further comprising a step of demodulating the plurality of data signals by the demodulators, wherein the threshold number corresponds to the number of demodulators in the gateway.

3. The control method as claimed in claim 2, wherein the gateway comprises a radio communication interface configured to receive the plurality of wireless data signals, the radio communication interface being connected to the demodulators, the method comprising a step of transmitting each of the data signals received by the communication interface to a respective demodulator.

4. The control method as claimed in claim 3, wherein the gateway further comprises an antenna for receiving the signals.

5. The control method as claimed in claim 4, wherein the receiving antenna is configured to receive data signals at a frequency within the frequency group of 433 MHz, 868 MHz and 915 MHz.

6. The control method as claimed in claim 1, wherein each data signal is a frame of a communication protocol chosen from among LoRa technology, Sigfox technology and WM-BUS technology.

7. The control method as claimed in claim 6, wherein determining the communication end date of each received data signal comprises, for each received data signal:
   Determining a length of the frame corresponding to said received data signal, and
   Calculating the communication end date of the frame corresponding to said received data signal as a function of said frame length and of a data rate of a radio channel through which said data signal has been received.

8. The control method as claimed in claim 1, wherein the gateway comprises an internal clock capable of providing a time stamp data element corresponding to the communication start date of each data signal received.

9. A data concentration gateway for a wireless communication network comprising a set of remote client devices transmitting data signals, the gateway comprising:
   a radio communication interface configured to receive radio data signals from the set of client devices,
   a plurality of demodulators configured to demodulate the data signals received by the communication interface,
   a control unit configured to execute the control method as claimed in claim 1.

10. The concentration gateway as claimed in claim 9, further comprising a network interface connected to a remote network and configured to transmit the demodulated data signals.

11. The concentration gateway as claimed in claim 9, the gateway further comprising an alarm configured to send an alarm data signal to a gateway management device connected to the gateway.

* * * * *